United States Patent Office 3,804,773
Patented Apr. 16, 1974

3,804,773
TRIAZOLE DERIVATIVES
Adolf Emil Siegrist, Basel, Switzerland, assignor to Ciba-Geigy AG, Basel, Switzerland
No Drawing. Filed Sept. 30, 1971, Ser. No. 185,421
Claims priority, application Switzerland, Oct. 1, 1970, 14,509/70
Int. Cl. D06l 3/12
U.S. Cl. 252—301.2 W    8 Claims

ABSTRACT OF THE DISCLOSURE

The invention concerns a process for the manufacture of triazole derivatives of the formula

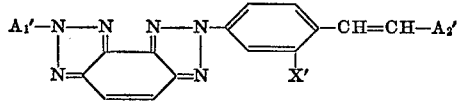

wherein $A_1'$ denotes diphenylyl-(4), naphthyl or a radical

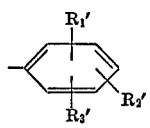

$A_2'$ denotes diphenylyl-(4), naphthyl, pyridyl-(3), thienyl-(2), m-tolyl or a radical

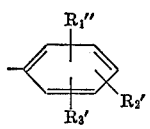

$X'$ denotes hydrogen, chlorine, nitrile or methoxy and $R_1''$, $R_2'$ and $R_3'$ are identical or different and represent hydrogen, alkyl with at least 2 carbon atoms, alkoxy or chlorine and $R_1''$ can also denote phenoxy, phenylmercaptan or alkylmercapto and $R_1''$ together with $R_2'$ can denote a methylenedioxy group, by means of the anilesynthesis. These new compounds are useful fluorescent whitening agents.

---

The present invention relates to new triazole derivatives of the category of benzo-[1,2-d: 3,4-d']bis-triazole, a new process for their manufacture, and their use.

A series of compounds of the category of the benzo-bis-triazole mentioned are already known, but these are derivatives substituted differently, especially those which as a result of the presence of sulphonic acid groups display substantially different properties.

The process of the present invention serves for the manufacture of new triazole derivatives of the formula (1a)

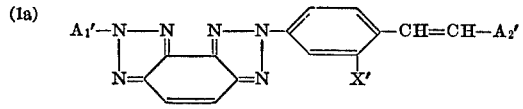

wherein $A_1'$ denotes diphenylyl-(4), naphthyl or a radical

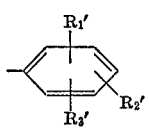

$A_2'$ denotes diphenylyl-(4), naphthyl, pyridyl-(3), thienyl-(2), m-tolyl or a radical

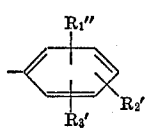

$X'$ denotes hydrogen, chlorine, nitrile or methoxy and $R_1''$, $R_2'$ and $R_3'$ are identical or different and represent hydrogen, alkyl with at least 2 carbon atoms, alkoxy or chlorine, and $R_1''$ can also denote phenoxy, phenylmercapto or alkylmercapto and $R_1''$ together with $R_2'$ can denote a methylenedioxy group, and of triazole derivatives of the formula (1b)

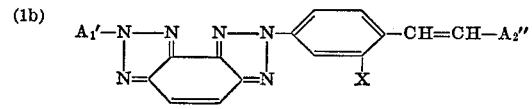

wherein $A_1'$ denotes diphenylyl-(4), naphthyl or a radical

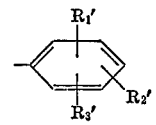

$A_2'$ denotes diphenylyl-(4), naphthyl, pyridyl-(3), thienyl-(2), m-tolyl or a radical

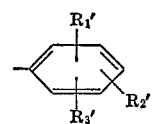

X denotes hydrogen, chlorine or methoxy and $R_1'$, $R_2'$ and $R_3'$ are identical or different and represent hydrogen, alkyl with at least 2 carbon atoms, alkoxy or chlorine and, furthermore, $R_1'$ can also denote phenoxy and $R_1'$ together with $R_2'$ can denote a methylenedioxy group.

The manufacturing process is characterized in that compounds of the formula (2)

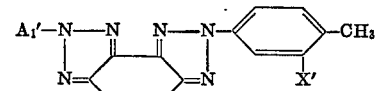

are reacted in the molar ratio of about 1:1 with Schiff's bases of the formula (3)

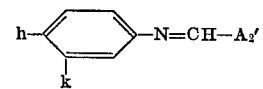

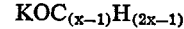

in the presence of dimethylformamide and of a potassium compound of the formula $$KOC_{(x-1)}H_{(2x-1)}$$

wherein, in these formulae, $A_1'$, $A_2'$ and $X'$ have the abovementioned meaning, $h$ and $k$ are identical or different and represent hydrogen, methoxy or halogen and $x$ represents an integer from 1 to 6.

Within the framework of the definition according to the Formula 1, compounds of practical interest are in particular triazole derivatives of the formula (4)

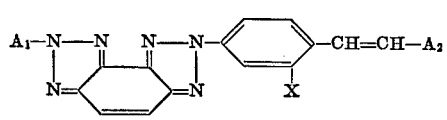

wherein $A_1$ denotes diphenylyl-(4), naphthyl or a radical

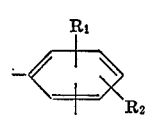

$A_2$ denotes diphenylyl-(4), naphthyl or pyridyl-(3) and, in the case that $A_1$ represents diphenylyl-(4), can also represent m-tolyl or a radical

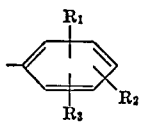

$R_1$, $R_2$ and $R_3$ can be identical or different and denote hydrogen, an alkyl group containing 2 to 4 carbon atoms, an alkoxy group containing 1 to 4 carbon atoms or chlorine, $R_1$ can also represent a phenoxy group or an alkylmercapto group containing 1 to 4 carbon atoms and $R_1$ together with $R_2$ can form a methylenedioxy group, and X represents hydrogen, chlorine or methoxy.

These compounds are manufactured analogously to the method indicated above, that is to say be reacting a compound of the formula (5)

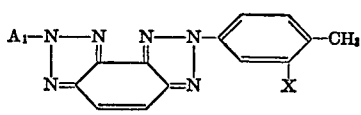

with a Schiff's base of the formula (6)

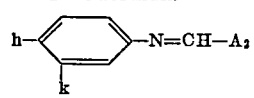

wherein $A_1$, $A_2$ and X have the abovementioned meaning and $h$ and $k$ are identical or different and represent hydrogen, methoxy or chlorine.

From the point of view of applications—above all with regard to their usability as brighteners for polyester spinning compositions—the following sub-groups of new triazole derivatives should be singled out particularly: (a) Triazole derivatives of the formula (7a)

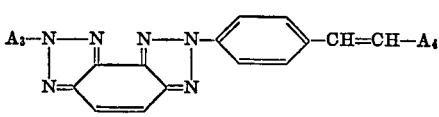

wherein $A_3$ denotes diphenylyl-(4) or a radical

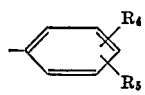

and $A_4$ denotes diphenylyl-(4) and, in the case that $A_3$ represents diphenylyl-(4), can also represent a radical

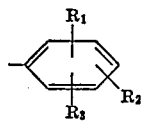

$R_1$, $R_2$ and $R_3$ can be identical or different and denote hydrogen, an alkyl or alkoxy group containing 1 to 4 carbon atoms, with the exception of methyl groups in the o- or p-position, $R_1$ can also represent a phenoxy group, or chlorine, $R_1$ together with $R_2$ can form a methylenedioxy group, and $R_4$ and $R_5$ can be identical or different and represent hydrogen, an alkyl group containing 2 to 4 carbon atoms, methoxy, ethoxy or chlorine.

(b) Triazole derivatives of the formula (7b)

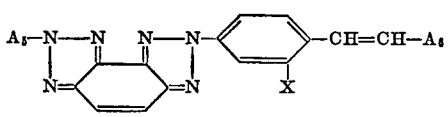

wherein $A_5$ denotes diphenylyl-(4), naphthyl or a radical

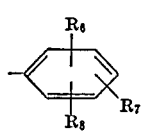

wherein $R_6$ denotes hydrogen, an alkyl group containing 2 to 4 carbon atoms, an alkoxy group containing 1 to 4 carbon atoms, a phenoxy group, an alkylmercapto group containing 1 to 4 carbon atoms or chlorine, $R_7$ and $R_8$ are identical or different and represent hydrogen or methoxy, X represents hydrogen, chlorine or methoxy and $A_6$ denotes diphenylyl-(4), naphthyl, pyridyl-(3), thienyl-(2) or a radical

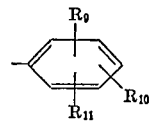

wherein $R_9$ denotes hydrogen, alkyl with 1 to 4 carbon atoms, with the exception of methyl groups in the o- or p-position, alkoxy with 1 to 4 carbon atoms, phenoxy or chlorine, $R_{10}$ and $R_{11}$ can be identical or different and denote hydrogen or methoxy or $R_{10}$ together with $R_{11}$ represent a methylenedioxy group.

(c) Triazole derivatives of the formula (8)

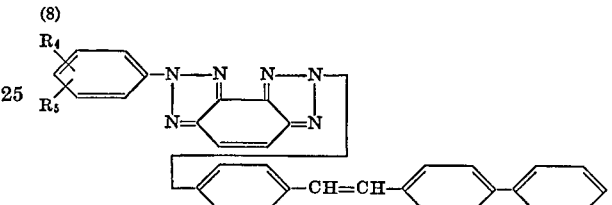

wherein $R_4$ and $R_5$ can be identical or different and represent hydrogen, an alkyl group containing 2 to 4 carbon atoms, methoxy, ethoxy or chlorine.

(d) Triazole derivatives of the formula (9)

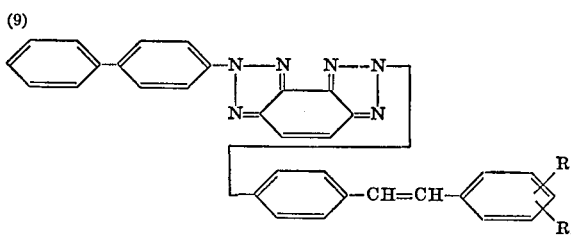

wherein $R_4$ and $R_5$ can be identical or different and represent hydrogen, an alkyl group containing 1 to 4 carbon atoms, with the exception of methyl groups in the o- or p-position, methoxy, ethoxy or chlorine.

(e) Triazole derivatives of the formula (10)

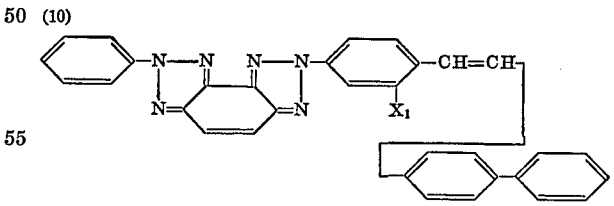

wherein $X_1$ denotes hydrogen or chlorine.

The compounds of the Formulae 7, 8, 9 and 10 are manufactured analogously, for example the triazole derivatives of the Formula 7 by reaction of compounds of the formula (11)

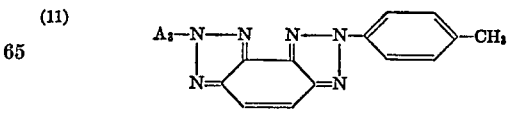

with a Schiff's base of the formula (12)

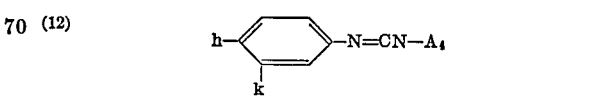

wherein $A_3$, $A_4$, $h$ and $k$ have the abovementioned meaning.

For most practical purposes it is advisable to use, as the Schiff's base, a compound of the formula (13)

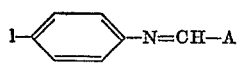

wherein l represents hydrogen, chlorine or methoxy and A denotes one of the radicals defined under $A_2'$, $A_3$ or $A_4$ or sub-classified elsewhere.

A general rule for the Schiff's base to be used as the second reactant in the present manufacturing process is, in accordance with the basic reaction principle, that the Schiff's base must be free of reactive methyl groups or of groups capable of salt formation.

These Schiff's bases represent the reaction products, which are in themselves known, of aldehydes of aromatic radicals A (as explained above) with primary amines. Though these primary amines can inherently be of aliphatic, carbocyclicaromatic or heterocyclic nature, with an amino group bonded to a tertiary carbon atom, for economic reasons other amines than aniline or its easily available derivatives will hardly be considered. This is predominantly because the amine radical is split off during the reaction and no longer appears in the end product. Hence, substituents which do not interfere with the reaction or, such as, for example, chlorine atoms, even accelerate the reaction, can definely be present in the amine radical.

The reactants carrying methyl groups (for example of the Formulae 2, 5, 11 and the like) are reacted with the Schiff's bases in the presence of dimethylformamide as the solvent.

Additionally, a strongly basic alkali compound is required for the reaction. By strongly basic alkali compounds there are to be understood, within the framework of the present invention, those compounds of the alkali metals (main Group I of the Periodic System of the Elements), including compounds of ammonium, which have a basic strength of at least approximately that of lithium hydroxide. Accordingly, they can be compounds of lithium, sodium, potassium, rubidium, caesium or ammonium of the type of, for example, the alcoholates, hydroxides, amides, hydrides or sulphides or strongly basic ion exchangers. For practical reasons (above all if mild reaction conditions as regards the reaction temperature appear indicated) potassium compounds of the composition $KOC_{x-1}H_{2x-1}$, wherein $x$ represents an integer from 1 to 6, are normally used, such as, for example, potassium hydroxide or potassium tertiarybutylate. In the case of alkali alcoholates and alkali amides (and hydrides) the reaction must be carried out in a practically anhydrous medium, while in the case of alkali hydroxides water contents of up to 25% (for example the presence of water of crystallization) are permitted. In the case of potassium hydroxide a water content of up to about 15% has proved appropriate. As examples of other usable alkali compounds, there may be mentioned: sodium methylate, sodium hydroxide, sodium amide, lithium amide, lithium hydroxide, rubidium hydroxide, caesium hydroxide and the like. Of course it is also possible to work with mixtures of such bases.

Approximately, the reactants containing methyl groups are reacted with the Schiff's bases in the stoichiometric ratio of 1:1, so that neither component is present in significant excess. Of the alkali compound, at least the equivalent amount is advantageously used, that is to say at least 2 mols of a compound with, for example, one KO group, per one mole of Schiff's base. When using potassium hydroxide, a 4-fold to 8-fold amount is preferably used.

The reaction according to the invention can generally be carried out at temperatures in the range of between 10 and 150° C. If alcoholates are used as the potassium compound in the reaction, the reaction frequently already succeeds at room temperature, in which case no external application of heat is necessary. When using potassium hydroxide it is in most cases necessary to use higher temperatures. For example, the reaction mixture is slowly warmed to 30–100° C. and is then kept at this temperature for some time, for example ½ to 2 hours. The final substances can be worked up from the reaction mixture in accordance with customary methods which are in themselves known.

The process described above has made it possible to manufacture in a simple manner a considerable number of compounds which are in themselves new and have hitherto, however, only been accessible indirectly.

The new compounds defined above show a more or less pronounced fluorescent in the dissolved or finely divided state. They can be used for the optical brightening of the most diverse synthetic or semi-synthetic materials, or substances which contain such organic materials.

The following groups of organic materials, where optical brightening thereof is relevant, may be mentioned as examples of the above, without the survey given below being intended to express any restriction thereto:

(I) Synthetic organic high molecular materials:
(a) Polymerization products based on organic compounds containing at least one polymerisable carbon-carbon double bond, that is to say their homopolymers or copolymers as well as their after-treatment products such as, for example, cross-linking, grafting or degradation products, polymer blends, or products obtained by modification of reactive groups, for example polymers based on $\alpha,\beta$-unsaturated carboxylic acids or derivatives of such carboxylic acids, especially on acrylic compounds (such as, for example acrylic esters, acrylic acid, acrylonitrile, acrylamides and their derivatives or their methacryl analogues), on olefine hydrocarbons (such as, for example, ethylene, propylene, styrenes or dienes and also so-called ABS polymers), and polymers based on vinyl and vinylidene compounds (such as, for example, vinyl chloride, vinyl alcohol or vinylidene chloride), (b) Polymerization products such as are, for example, obtainable by ring opening, for example, polyamides of the polycaprolactam type, and also polymers which are obtainable both via polyaddition and via polycondensation, such as polyethers or polyacetals.

(c) Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyesters) or unsaturated (for example maleic acid dialcohol polycondensates as well as their crosslinking products with copolymerizable vinyl monomers), unbranched or branched (also based on higher-functional alcohols, such as, for example, alkyd resins) polyesters, polyamides (for example hexamethylenediamine adipate), maleate resins, melamine resins, their precondensates and analogues, polycarbonates and silicones, (d) Polyaddition products such as polyurethanes (crosslinked and non-crosslinked) and epoxide resins.

(II) Semi-synthetic organic materials, for example cellulose esters of varying degrees of esterification (so-called 2½-acetate or triacetate) or cellulose ethers, regenerated cellulose (viscose or cuprammonium cellulose), or their after-treatment products, and casein plastics.

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection moldings, various machined articles, chips, granules or foams, and also predominantly two-dimensional bodies such as films, foils, lacquers, coatings, impregnations and laminations, or predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flocked structures or woven textile fabrics, textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flocked substrates or laminates, are to be optically brightened according to the invention, this is advantageously effected in an aqueous medium, wherein the compounds in question are present in a finely divided form (suspensions, so-called micro-dispersions or possibly solutions). If desired, dispersing agents, stabilizers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20 to 140° C., for example at the boiling point of the bath or near it (about 90° C.). Solutions or emulsions in organic solvents can also be used for the finishing, according to the invention, of textile substrates, as is practiced in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, sheets (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerization, polycondensation or polyaddition.

Powdering onto polymer chips or granules for spinning compositions,

Bath dyeing of polymer chips or granules for spinning compositions,

Metered addition to spinning melts or spinning solutions, and

Application to the tow before stretching.

The new optical brighteners according to the present invention can, for example, also be employed in the following use forms:

(a) Mixed with dyestuffs (shading) or pigments (colored or, in particular, for example, white pigments).

(b) Mixed with so-called "carriers," wetting agents, plasticizers, swelling agents, anti-oxidants, light protection agents and heat stabilizers.

(c) Mixed with crosslinking agents or finishes (for example starch or synthetic finishes), and in combination with the most diverse textile finishing processes, especially synthetic resin finishes (for example creaseproof finishes such as "wash-and-wear," "permanent-press" or "no-iron"), as well as flameproof finishes, soft handle finishes, anti-soiling finishes or antistatic finishes, or antimicrobial finishes.

(d) Incorporation of the optical brighteners into polymeric carriers (polymerizaiton, polycondensation or polyaddition products), in a dissolved or dispersed form, for use, for example, in coating compositions, impregnating compositions or binders (solutions, dispersions and emulsions) for textiles, fleeces, paper and leather.

(e) As additives to so-called "master batches."

(f) As additives to the most diverse industrial products in order to render these more marketable (for example improving the appearance of pigments).

(g) In combination with other optically brightening substances.

(h) In spinning bath preparations, that is to say as additives to spinning baths such as are used for improving the slip for the further processing of synthetic fibres, or from a special bath before the stretching of the fibre.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example polyester fibres, with the brighteners according to the invention, is to impregnate these fibres with the aqueous dispersions (or, where appropriate, solutions) of the brighteners at temperatures below 75° C., for example at room temperature, and to subject them to a dry heat treatment at temperatures above 100° C., it being generally advisable additionally to dry the fibre material beforehand at a moderately elevated temperature, for example at not less than 60° C. and up to about 130° C. The heat treatment in the dry state is then advantageously carried out at temperatures between 120 and 225° C., for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and at times up to about 2 percent by weight can also be employed. For most practical purposes, amounts between 0.0005 and 0.5 percent by weight are of preferred interest.

In the examples, the parts, unless otherwise stated, are always parts by weight and the percentages are always percentages by weight. Unless otherwise stated, melting points and boiling points are uncorrected.

EXAMPLE 1

4.08 g. of 2-phenyl-7-(p-tolyl)-benzo[1,2-d:3,4-d']-bis-triazole of the formula (14)

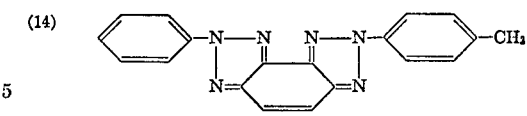

(melting point: 218 to 219° C.), 2.7 g g. of the anil from benzaldehyde and p-chloroaniline and 3.1 g. of potassium hydroxide powder, containing about 10% of water, are stirred in 80 ml. of dimethylformamide with exclusion of air. The temperature is brought to 60° C. over the course of 30 minutes, in the course of which a blue-violet coloration appears. The reaction mixture is stirred for a further 60 minutes at 60 to 65° C., 200 ml. of methanol are thereafter added and the whole is cooled to 0° C.

The product which precipitates is filtered off, washed with 100 ml. of methanol and dried. 5.0 g. (corresponding to 96.6% of theory) of 2-phenyl-7-(stilben-4-yl)-benzo-[1,2-d:3,4-d']-bis-triazole of the formula (15)

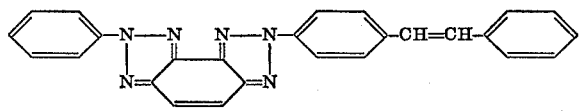

are obtained as a light yellow powder. On twice recrystallizing from xylene (fuller's earth), 4.3 g. (83.1% of theory) of light greenish-tinged yellow fine glistening crystals of melting point 254 to 255° C. are obtained.

*Analysis.*—For $C_{26}H_{18}N_6$ (414.45): Calculated (percent): C, 75.34; H, 4.38; N, 20.28. Found (percent): C, 75.34; H, 4.42; N, 20.28.

The 2 - phenyl - 7 - (stilben-4-yl)-benzo-[1,2-d:),4-d'] bis-triazole derivatives of the formula (16)

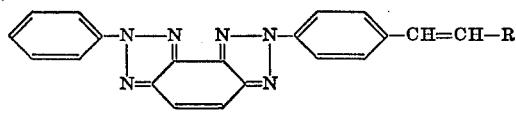

listed in the table which follows can be prepared in a similar manner:

| Number: | R | Melting point, °C. |
|---|---|---|
| 17 | m-C₆H₄Cl | 261–262 |
| 18 | p-C₆H₄Cl | 294–295 |
| 19 | m-C₆H₄CH₃ | 236–237 |
| 20 | p-C₆H₄—C₆H₅ | 314–315 |
| 21 | m-C₆H₄OCH₃ | 228–229 |
| 22 | p-C₆H₄OCH₃ | 280–281 |
| 23 | p-C₆H₄OC₂H₅ | 272–273 |
| 24 | 2,3-C₆H₃(OCH₃)₂ | 210–211 |
| 25 | 2,5-C₆H₃(OCH₃)₂ | 221–222 |
| 26 | 3,4-C₆H₃(OCH₃)₂ | 231–232 |
| 27 | 3,5-C₆H₃(OCH₃)₂ | 227–228 |
| 28 | Pyridyl-3 | 270–271 |
| 29 | Thienyl-2 | 240–241 |

The compounds of the Formula 16 listed in the table which follows can also be prepared in a similar manner, but using aniline instead of p-chloroaniline for forming the Schiff's base:

| Number: | R | Melting point, °C. |
|---|---|---|
| 30 | p-C₆H₄—CH—(CH₃)₂ | 257–258 |
| 31 | p-C₆H₄OC₆H₅ | 255–256 |
| 32 | 3,4,5-C₆H₂(OCH₃)₃ | 245–246 |
| 33 | 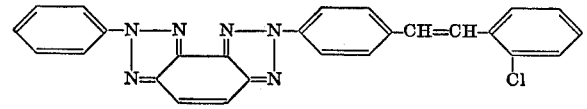 | 288–289 |
| 34 | Naphthyl-1 | 233–234 |
| 35 | Naphthyl-2 | 290–291 |

At a reaction temperature of 40 to 45° C. instead of 60 to 65° C., the Schiff's base from o-chlorobenzaldehyde and p-chloroaniline can be reacted in a similar manner to give the compound of the formula (36)

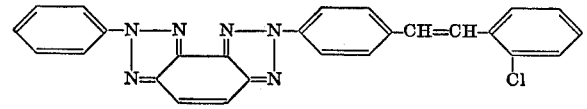

of melting point 228 to 229° C.

EXAMPLE 2

4.51 g. of 2 - phenyl - 7 - (3-chloro-4-methyl-phenyl)-benzo[1,2-d:3,4-d']-bis-triazole of the formula (37)

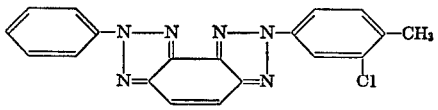

(melting point: 265 to 266° C.), 3.65 g. of the anil from diphenyl-4-aldehyde and p-chloroaniline and 3.1 g. of potassium hydroxide powder containing about 10% of water, in 200 ml. of dimethylformamide, are stirred whilst excluding air. The temperature is brought to 60° C. over the course of 30 minutes, in the course of which a dark blue coloration appears. The reaction mixture is stirred for a further 30 minutes at 60 to 65° C., thereafter 400 ml. of methanol are added, and the whole is cooled to 0° C. The product which precipitates is filtered off, washed with 350 ml. of methanol and dried. 5.7 g., corresponding to 87.7% of theory, of 2-phenyl-7-(2-chloro-4'-phenyl-stilben-4-yl)-benzo[1,2-d]-bis-triazole of the formula (38)

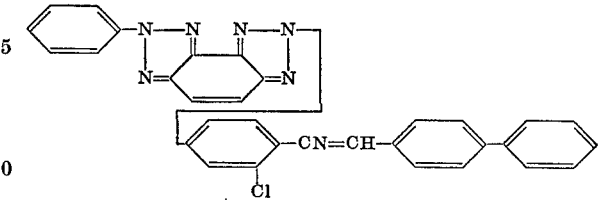

are obtained as a light yellow powder of melting point 246 to 247° C. On twice recrystallizing from xylene (fuller's earth), 4.5 g. (69.3% of theory) of light, greenish-tinged yellow, very fine crystals melting at 247 to 248° C. are obtained.

*Analysis.*—For $C_{32}H_{21}ClN_6$ (525.02): Calculated (percent): C, 73.21; H, 4.03; N, 16.01. Found (percent): C, 72.97; H, 4.02; N, 16.14.

The compounds of the formula (45)

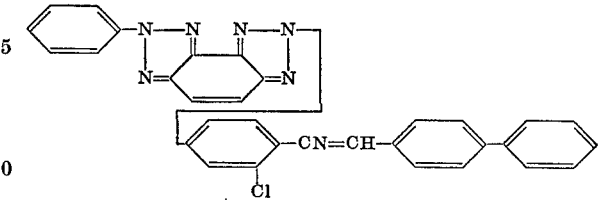

listed in the table which follows can be prepared in a similar manner at a reaction temperature of 40 to 45° C. and with a reaction time of 60 minutes:

| Number: | R | Melting point, °C. |
|---|---|---|
| 40 | C₆H₅ | 250–251 |
| 41 | p-C₆H₄Cl | 298–299 |
| 42 | p-C₆H₄OCH₃ | 260–261 |
| 43 | Naphthyl-1 | 248–249 |
| 44 | Naphthyl-2 | 250–251 |

EXAMPLE 3

4.45 g. of 2-phenyl-7-(3-methoxy-4-methyl-phenyl)-benzo-[1,2-d':3,4-d']bis-triazole of the formula (45)

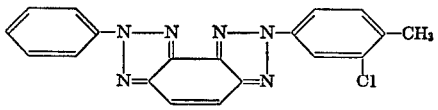

(melting point: 227 to 228° C.) and 2.7 g. of the anil from benzaldehyde and p-chloroaniline, in 100 ml. of dimethylformamide, are stirred whilst excluding air and warmed to 60° C. After adding 3.1 g. of potassium hydroxide powder containing about 10% of water, the temperature is brought to 90° C. over the course of 30 minutes, in the course of which a violet coloration appears. The reaction mixture is stirred for a further 60 minutes at 90 to 95° C., 400 ml. of methanol are thereafter added and the whole is cooled to 0° C. The product which precipitates is filtered off, washed with 150 ml. of methanol and dried. 5.2 g., corresponding to 94.6% of theory, of 2-phenyl-7-(2-methoxystilben-4-yl)-benzo[1,2-d:3,4-d']bis-triazole of the formula (46)

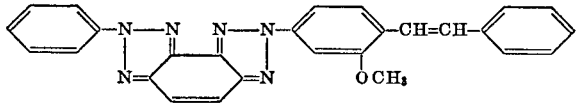

are obtained in the form of a yellow powder of melting point 224.5 to 225.5° C. On twice recrystallizing from toluene-ethanol, 1:4 (fuller's earth), 4.3 g. (78.2% of theory) of light, greenish-tinged yellow very fine crystals, melting at 225 to 226° C., are obtained.

Analysis.—For $C_{27}H_{20}N_6O$ (444.48): Calculated (percent): C, 72.95; H, 4.54; N, 18.91. Found (percent): C, 72.94; H, 4.48; N, 19.10.

The 2-phenyl-7-(2-methoxy-stilben-4-yl)-benzo[1,2-d:3,4-d']bis-triazole derivatives of the formula (47)

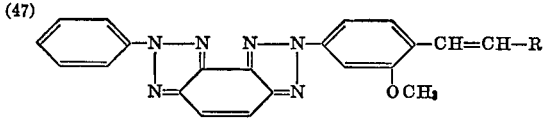

listed in the table which follows can be prepared in a similar manner:

| R | Melting point, °C. |
|---|---|
| Number: | |
| 48 ... $m-C_6H_4OCH_3$ | 196–196.5 |
| 49 ... $p-C_6H_4OCH_3$ | 226–227 |
| 50 ... $p-C_6H_4-C_6H_5$ | 261–262 |
| 51 ... Napthyl-(1) | 230–231 |
| 52 ... Napthyl-(2) | 246–247 |

EXAMPLE 4

4.51 g. of 2-[m-chloro-phenyl)-7 - (p - tolyl) - benzo-[1,2-d:3,4-d']bis-triazole of the formula (53)

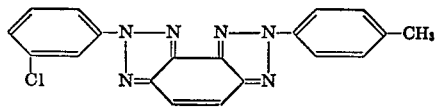

(melting point: 261° C.), 3.07 g. of the anil from p-methoxy-benzaldehyde and p-chloroaniline and 3.1 g. of potassium hydroxide powder containing about 10% of water are reacted in 120 ml. of dimethylformamide in accordance with the instructions of Example 3. 5.7 g., corresponding to 95.3% of theory, of 2-(m-chlorophenyl)-7-(4'-methoxy-stilben-4-yl)-benzo[1,2-d:3,4 - d'] bis-triazole of the formula (54)

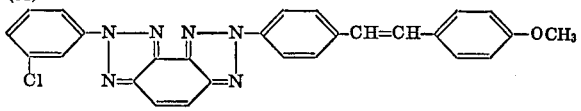

are obtained in the form of a pale yellow powder of melting point 306 to 310° C. On twice recrystallizing from o-dichlorobenzene (fuller's earth), 4.3 g. (71.8% of theory) of pale greenish-tinged yellow, very fine small needles, melting at 320 to 321° C., are obtained.

Analysis.—For $C_{27}H_{19}ClN_6O$ (487.94): Calculated (percent): C, 67.71; H, 4.00; N, 17.55. Found (percent): C, 67.93; H, 4.00; N, 17.54.

The 2-(m-chlorophenyl)-7-(stilben-4-yl) - benzo-[1,2-d:3,4-d']bis-triazole derivatives of the formula (55)

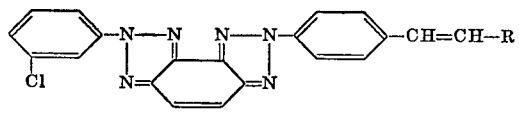

listed in the table which follows can be prepared in a similar manner:

| R | Melting point, °C. |
|---|---|
| Number: | |
| 56 ... $C_6H_5$ | 292–293 |
| 57 ... $p-C_6H_4-iPr$ | 283–284 |
| 58 ... $p-C_6H_4Cl$ | 319–320 |
| 59 ... $m-C_6H_4OCH_3$ | 261–262 |
| 60 ... $p-C_6H_4-C_6H_5$ | 331–332 |
| 61 ... Naphthyl-(1) | 265–266 |
| 62 ... Naphthyl-(2) | 311–312 |

EXAMPLE 5

4.45 g. of 2-(o-methoxyphenyl)-7-(p-tolyl)-benzo-[1,2-d:3,4-d']bis-triazole of the formula (63)

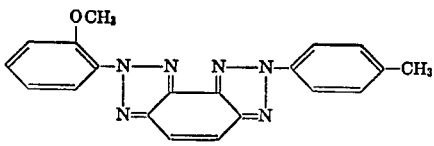

(melting point: 189.5 to 190° C.) and 3.65 g. of the anil from diphenyl-4-carbaldehyde and p-chloroaniline, in 100 ml. of dimethylformamide, are stirred whilst excluding air and warmed to 40° C. After adding 3.1 g. of potassium hydroxide powder containing about 10% of water, the temperature is brought to 60° C. over the course of 30 minutes, in the course of which a violet coloration appears. The reaction mixture is stirred for a further 60 minutes at 60 to 65° C., 400 ml. of methanol are then added and the whole is cooled to 0° C. The product which precipitates is filtered off, washed with 150 ml. of methanol and dried. 6.0 g., corresponding to 92.3% of theory, of 2-(o-methoxyphenyl)-7-(p-phenyl-stilben-4-yl)-benzo-[1,2-d:3,4-d']bis-triazole of the formula (64)

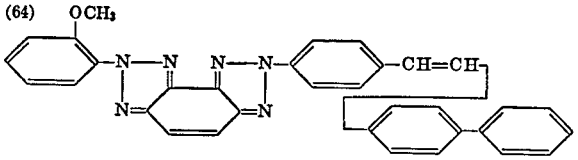

are obtained in the form of a light yellow powder of melting point 258 to 259° C. On twice recrystallizing from toluene (fuller's earth), 5.4 g. (83.1% of theory) of light greenish-tinged yellow, very fine small needles, melting at 259 to 260° C., are obtained.

Analysis.—For $C_{33}H_{24}N_6O$ (520.57): Calculated (percent): C, 76.13; H, 4.65; N, 16.15. Found (percent): C, 76.34; H, 4.67; N, 16.19.

The 2-(o-methoxyphenyl) - 7 - (stilben-4-yl)-benzo-[1,2-d:3,4-d']bis-triazole derivatives of the formula (65)

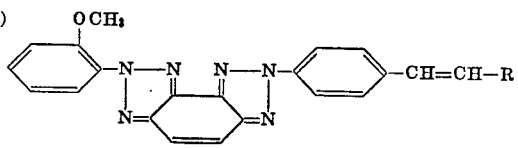

listed in the table which follows can be prepared in a similar manner:

| R | Melting point, °C. |
|---|---|
| Number: | |
| 66 ............ C₆H₅ | 206–207 |
| 67 ............ p-C₆H₄Cl | 236–237 |
| 68 ............ p-C₆H₄OCH₃ | 231–232 |
| 69 ............ Naphthyl-(1) | 204–205 |
| 70 ............ Naphthyl-(2) | 231–232 |

EXAMPLE 6

4.45 g. of 2-(m-methoxy-phenyl)-7-(p-tolyl)-benzo-[1,2-d:3,4′]bis-triazole of the formula

(71)
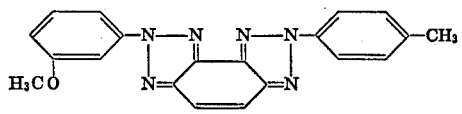

(melting point: 210.5 to 211.5° C.), 2.7 g. of the anil from benzaldehyde and p-chloroaniline and 3.1 g. of potassium hydroxide powder containing about 10% of water are reacted in 100 ml. of dimethylformamide in accordance with the instructions of Example 1.

5.2 g., corresponding to 94.5% of theory, of 2-(m-methoxyphenyl)-7-(stilben-4-yl)-benzo[1,2-d:3,4-d′]bis-triazole of the formula

(72)
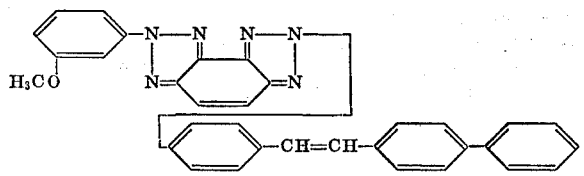

are obtained in the form of a light yellow powder of melting point 230 to 231° C. On twice recrystallizing from xylene (fuller's earth), 3.6 g. (70.9% of theory) of pale green fine glistening flakes of melting point 245 to 246° C. are obtained.

Analysis.—For $C_{27}H_{20}N_6O$ (444.48): Calculated (percent): C, 72.95; H, 4.54; N, 18.91. Found (percent): C, 72.97; H, 4.63; N, 19.06.

The 2-(m-methoxy-phenyl)-7-(stilben-4-yl)-benzo-[1,2-d:3,4-d′]-bis-triazole derivatives of the formula

(73)
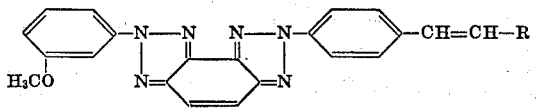

listed in the table which follows can be prepared in a similar manner:

| R | Melting point, °C. |
|---|---|
| Number: | |
| 74 ........ p-C₆H₄—CH—(CH₃)₂ | 238–239 |
| 75 ........ m-C₆H₄Cl | 241–242 |
| 76 ........ p-C₆H₄Cl | 259–260 |
| 77 ........ m-C₆H₄OCH₃ | 209–210 |
| 78 ........ p-C₆H₄—C₆H₅ | 300–301 |
| 79 ........ Naphthyl-(1) | 213–214 |
| 80 ........ Naphthyl-(2) | 265–266 |

EXAMPLE 7

4.45 g. of 2-(p-methoxy-phenyl)-7-(p-tolyl)-benzo-[1,2-d:3,4-d′]bis-triazole of the formula

(81)
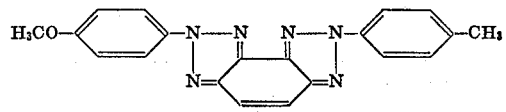

(melting point: 252 to 253° C.), 2.7 g. of the anil from benzaldehyde and p-chloroaniline and 3.1 g. of potassium hydroxide powder containing about 10% of water are reacted in 120 ml. of dimethylformamide in accordance with the instructions of Example 3. 5.3 g., corresponding to 96.3% of theory, of 2-(p-methoxy-phenyl)-7-(stilben-4-yl)-benzo[1,2-d:3,4-d′]bis-triazole of the formula

(82)
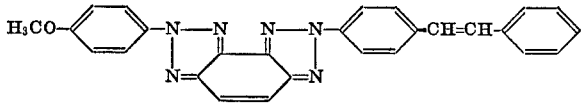

are obtained in the form of a pale yellow powder of melting point 282 to 283° C. On twice recrystallizing from xylene (fuller's earth), 4.6 g. (83.7% of theory) of colorless, very fine crystals, melting at 283 to 284° C., are obtained.

Analysis.—For $C_{27}H_{20}N_6O$ (444.48): Calculated (percent): C, 72.95; H, 4.54; N, 18.91. Found (percent): C, 72.78; H, 4.60; N, 18.83.

The 2-(p-methoxy-phenyl)-7-(stilben-4-yl)-benzo-[1,2-d:3,4-d′]bis-triazole derivatives of the formula

(83)
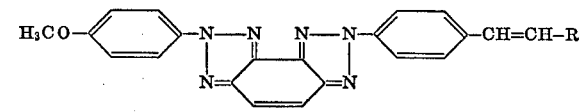

listed in the table which follows can be prepared in a similar manner:

| R | Melting point, °C. |
|---|---|
| Number: | |
| 84 ............ p-C₆H₄Cl | 310–311 |
| 85 ............ m-C₆H₄OCH₃ | 243–244 |
| 86 ............ p-C₆H₄OCH₃ | 304–306 |
| 87 ............ p-C₆H₄—C₆H₅ | 337–338 |
| 88 ............ Naphthyl-(1) | 268–269 |
| 89 ............ Naphthyl-(2) | 300–301 |

EXAMPLE 8

4.98 g. of 2-(p-butoxy-phenyl)-7-(p-tolyl)-benzo[1,2-d:3,4d′]bis-triazole of the formula

(90)
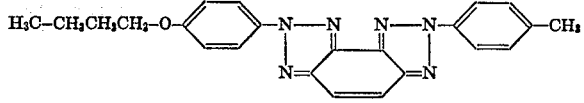

(melting point: 202 to 203° C.), 2.7 g. of the anil from benzaldehyde and p-chloroaniline and 3.1 g. of potassium hydroxide powder containing about 10% of water, in 100 ml. of dimethylformamide, are stirred whilst excluding air. The temperature is brought to 90° C. over the course of 30 minutes, in the course of which a violet-brown coloration appears. The reaction mixture is stirred for a further 60 minutes at 90 to 95° C., 400 ml. of methanol are then added and the mixture is cooled to 0° C. The product which has precipitated is filtered off, washed with 100 ml. of methanol and dried. 5.8 g., corresponding to 96.7% of theory, of 2-(p-butoxy-phenyl)-7-(stilben-4-yl)-benzo[1,2-d:3,4-d′]bis-triazole of the formula

(91)
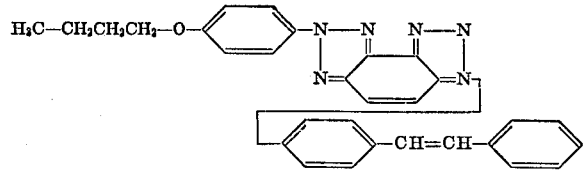

are obtained in the form of a pale yellow powder of melting point 273 to 274° C. On twice recrystallizing from toluene (fuller's earth), 5.3 g. (88.3% of theory) of colorless felted small needles, melting at 281 to 282° C., are obtained.

*Analysis.*—For $C_{30}H_{26}N_6O$ (486.56): Calculated (percent): C, 74.05; H, 5.39; N, 17.27. Found (percent): C, 74.34; H, 5.55; N, 17.39.

The 2-(p-butoxy-phenyl) - 7 - (stilben-4-yl)-benzo-[1,2-d:3,4-d']bis-triazole derivatives of the formula (92)

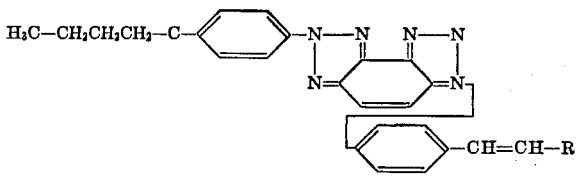

listed in the table which follows can be prepared in a similar manner:

| Number: | R | Melting point, °C. |
| --- | --- | --- |
| 93 | m-C₆H₄Cl | 259–260 |
| 94 | p-C₆H₄Cl | 310–311 |
| 95 | m-C₆H₄OCH₃ | 264–265 |
| 96 | p-C₆H₄—C₆H₅ | 337–338 |
| 97 | Naphthyl-(1) | 220–221 |
| 98 | Naphthyl-(2) | 284–285 |

EXAMPLE 9

5.23 g. of 2-(p-phenoxy-phenyl)-7-(p-tolyl)-benzo-[1,2-d:3,4-d']bis-triazole of the formula (99)

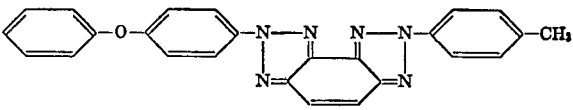

(melting point: 177.5 to 178° C.), 3.13 g. of the anil from p-chlorobenzaldehyde and p-chloroaniline and 3.1 g. of potassium hydroxide powder, containing about 10% of water, are reacted in 120 ml. of dimethylformamide in accordance with the instructions of Example 3. 6.4 g., corresponding to 95.5% of theory, of 2-(p-phenoxy-phenyl)-7-(4'-chloro-stilben - 4 - yl)-benzo[1,2-d:3,4-d'] bis-triazole of the formula (100)

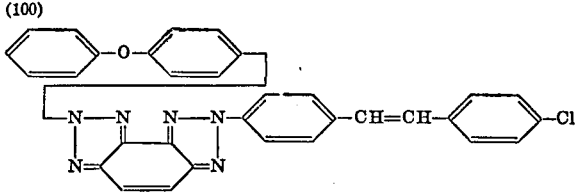

are obtained in the form of a light beige-yellow powder of melting point 275 to 277° C. On twice recrystallizing from xylene (fuller's earth), 5.0 g. (74.7% of theory) of pale green, glistening flakes, melting at 282 to 283° C., are obtained.

*Analysis.*—For $C_{32}H_{21}ClN_6O$ (541.01): Calculated (percent): C, 71.04; H, 3.91; N, 15.53. Found (percent): C, 71.31; H, 4.03; N, 15.57.

The 2-(p-phenoxy-phenyl)-7-(stilben-4-yl-benzo[1,2-d: 3,4-d']bis-triazole derivatives of the formula (101)

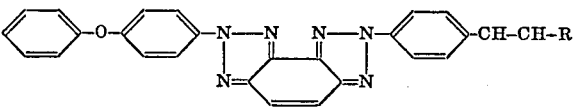

listed in the table which follows can be prepared in a similar manner:

| Number: | R | Melting point, °C. |
| --- | --- | --- |
| 102 | C₆H₅ | 267–268 |
| 103 | m-C₆H₄OCH₃ | 221–222 |
| 104 | p-C₆H₄—C₆H₅ | 320–321 |
| 105 | Naphthyl-(1) | 242–243 |
| 106 | Naphthyl-(2) | 284–285 |

EXAMPLE 10

4.21 g. of 2 - (4 - chloro-2,5-dimethoxy-phenyl)-7-(p-tolyl)-benzo[1,2-d:3,4-d']bis-trizole of the formula (107)

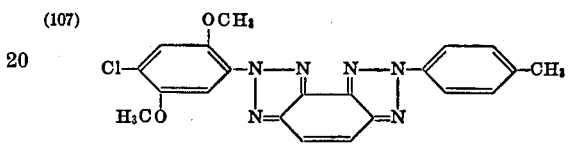

(melting point: 225 to 226°), 2.66 g. of the anil from 2-naphthaldehyde and p-chloroaniline and 2.5 g. of potassium hydroxide powder containing about 10% of water are reacted in 120 ml. of dimethylformamide in accordance with the instructions of Example 8. 4.4 g., corresponding to 78.8% of theory, of 2-(4-chloro-2,5-dimethoxy - phenyl) - 7 - (3',4' - benzo-stilben-4-yl)-benzo [1,2-d:3,4-d'-bis-triazole of the formula (108)

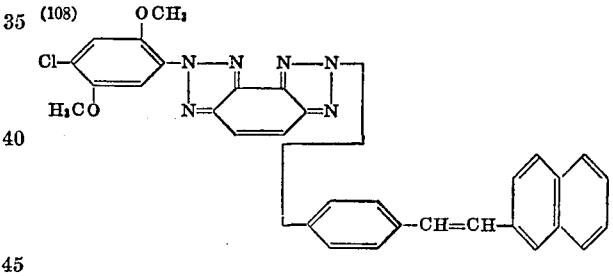

are obtained in the form of a light yellow powder of melting point 241 to 247° C. On twice recrystallizing from xylene (fuller's earth), 2.9 g. (51.8% of theory) of light yellow, very fine small needles, melting at 256 to 257° C., are obtained.

*Analysis.*—For $C_{32}H_{23}ClN_6O_2$ (559.03): Calculated (percent): C, 68.75; H, 4.15; N, 15.03. Found (percent): C, 68.96; H, 4.22; N, 15.02.

The 2 - (4 - chloro-2,5-dimethoxy-phenyl)-7-(stilben-4-yl)benzo[1,2-d:3,4-d']bis-triazole derivatives of the formula (109)

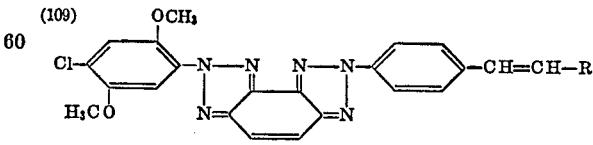

listed in the table which follows can be prepared in a similar manner:

| Number: | R | Melting point, °C. |
| --- | --- | --- |
| 110 | C₆H₅ | 258–259 |
| 111 | p-C₆H₄Cl | 291–292 |
| 112 | p-C₆H₄—C₆H₅ | 293–294 |

Starting from 2-(2,5-dimethoxy-phenyl)-7-(p-tolyl)-benzo[1,2-d:3,4-d']bis-triazole of the formula (113)

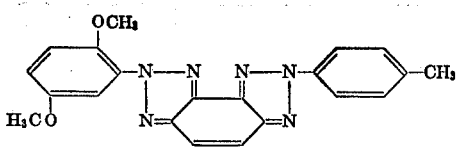

(melting point: 205 to 206° C.) and following the instructions of Example 1, the 2-(2,5-dimethoxy-phenyl)-7-(stilben-4-yl)benzo[1,2-d:3,4-d']bis-triazole derivatives of the formula (114)

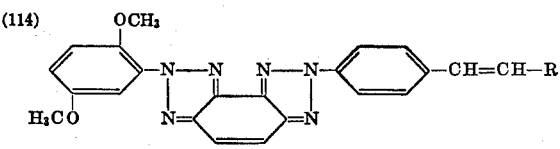

listed in the table which follows can be prepared:

| Number: | R | Melting point, °C. |
|---|---|---|
| 115 | C₆H₅ | 216-217 |
| 116 | p-C₆H₄Cl | 232-233 |
| 117 | p-C₆H₄—C₆H₅ | 236-237 |

EXAMPLE 11

4.66 g. of 2-(m-methylmercapto-phenyl)-7-(p-tolyl)-benzo[1,2-d:3,4-d']bis-triazole of the formula (118)

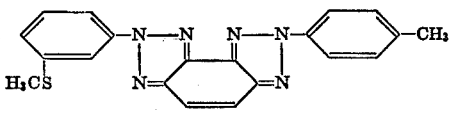

(melting point: 202 to 203° C.), 3.07 g. of the anil from m-methoxy-benzaldehyde and p-chloroanilin and 3.1 g. of potassium hydroxide powder containing about 10% of water are reacted in 100 ml. of dimethylformamide in accordance with the instructions of Example 8. 6.0 g., corresponding to 98.4% of theory, of 2-(m-methylmercapto-phenyl)-7-(3'-methoxy-stilben-4-yl)-benzo-[1,2-d:3,4-d']bis-triazole of the formula (119)

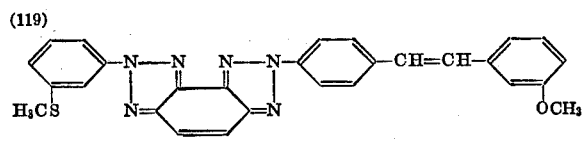

are obtained in the form of a beige powder of melting point 204 to 205° C. On twice recrystallizing from toluene (fuller's earth), 5.0 g. (82.0% of theory) of pale greenish-tinged yellow, very fine crystals, melting at 205 to 206° C., are obtained.

Analysis.—For $C_{28}H_{22}N_6OS$ (490.58); Calculated (percent): C, 68.55; H, 4.52; N, 17.13. Found (percent): C, 68.54; H, 4.65; N, 17.30.

The 2 - (m-methyl-mercapto-phenyl)-7-(stilben-4-yl)-benzo[1,2-d:3,4-d']bis-triazole derivatives of the formula (120)

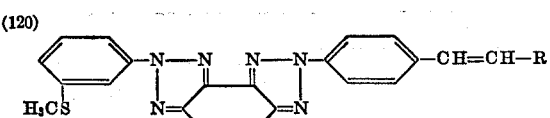

listed in the table which follows can be prepared in a similar manner:

| Number: | R | Melting point, °C. |
|---|---|---|
| 121 | C₆H₅ | 234-235 |
| 122 | m-C₆H₄Cl | 234-235 |
| 123 | p-C₆H₄Cl | 264-265 |
| 124 | p-C₆H₄—C₆H₅ | 296-297 |
| 125 | Naphthyl-(2) | 262-263 |

EXAMPLE 12

4.61 g. of 2 - (p - isopropyl-phenyl)-7-(p-tolyl)-benzo-[1,21d:3,4-d']bis-triazole of the formula (126)

(melting point: 213 to 214° C.), 3.65 g. of the anil from diphenyl-4-carbaldehyde and p-chloraniline and 3.1 g. of potassium hydroxide powder containing about 10% of water are reacted in 100 ml. of dimethylformamide in accordance with the instructions of Example 1. 5.7 g., corresponding to 87.7% of theory, of 2-(p-isopropyl-phenyl)-7-(4'-phenyl-stilben-4-yl)-benzo[1,2 - d:3,4-d']-bis-triazole of the formula (127)

are obtained in the form of a light yellow powder of melting point 301 to 308° C. On twice recrystallizing from xylene (fuller's earth), 4.65 g. (71.6% of theory) of pale greenish-tinged yellow, very fine crystals, melting at 308 to 309° C., are obtained.

Analysis.—For $C_{35}H_{28}N_6$ (532.62): Calculated (percent): C, 78.92; H, 5.30; N, 15.78. Found (percent): C, 78.92; H, 5.41; N, 15.93.

The 2 - (p - isopropyl-phenyl)-7-(stilben-4-yl)-benzo-[1,2-d:3,4-d']bis-triazole derivatives of the formula (128)

listed in the table which follows can be prepared in a similar manner:

| Number: | R | Melting point, °C. |
|---|---|---|
| 129 | C₆H₅ | 244-245 |
| 130 | p-C₆H₄-iPr | 284-285 |
| 131 | Naphthyl-(1) | 242-243 |
| 132 | Naphthyl-(2) | 277-278 |

Starting from 2-(o-isopropyl-7-(p-tolyl)-benzo-[1,2-d:3,4-d']bis-triazole of the formula (133)

(melting point: 185 to 185.5° C.) and the following instructions of Example 1 whilst reducing the reaction time to 30 minutes, the 2-(o-isopropyl-phenyl)-7-(stilben-4-yl)-benzo[1,2-d:3,4-d']-bis-triazole derivatives of the formula (134) 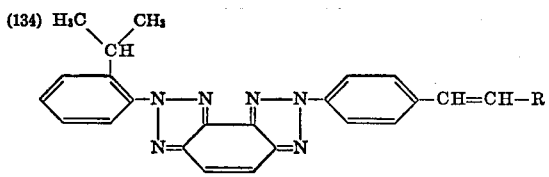

listed in table which follows can be prepared:

| R | Melting point, °C. |
|---|---|
| Number: | |
| 135 ............... C₆H₅ | 232-233 |
| 136 ............... p-C₆H₄Cl | 278-279 |
| 137 ............... p-C₆H₄OCH₃ | 278-279 |
| 138 ............... p-C₆H₄C₆H₅ | 282-283 |
| 139 ............... Naphthyl-(1) | 192-192.5 |
| 140 ............... Naphthyl-(2) | 241-242 |

EXAMPLE 13

5.03 g. of 2-(biphenyl-4-yl)-7-(p-tolyl)-benzo-[1,2-d:3,4-d']bis-triazole of the formula (141) 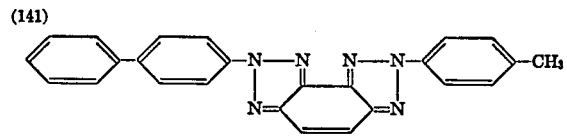

(melting point: 264 to 265° C.), 2.88 g. of the anil from m-toluylaldehyde and p-chloroaniline and 3.1 g. of potassium hydroxide powder containing about 10% of water are reacted in 120 ml. of dimethylformamide in accordance with the instructions of Example 3. 6.2 g., corresponding to 98.4% of theory, of 2-(biphenyl-4-yl)-7-(3'-methyl-stilben-4-yl)-benzo-[1,2-d:3,4-d']bis triazole of the formula (142) 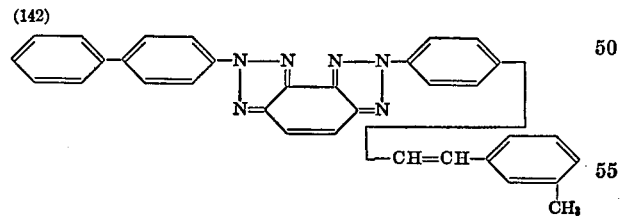

are obtained in the form of a pale yellow powder of melting point 289 to 291° C. On twice recrystallizing from xylene (fuller's earth), 5.2 g. (82.5% of theory) of pale green very fine crystals, melting at 293 to 294° C., are obtained.

Analysis.—For $C_{33}H_{24}N_6$ (504.57): Calculated (percent): C, 78.55; H, 4.79; N, 16.66. Found (percent): C, 78.78; H, 4.75; N, 16.41.

The 2-(biphenyl-4-yl)-7-(stilben-4-yl)-benzo[1,2-d:3,4-d']bis-triazole derivatives of the formula (143) 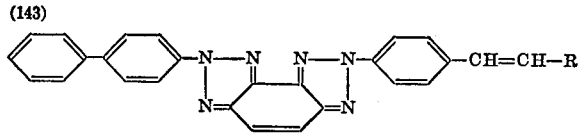

listed in the table which follows can be prepared in a similar manner:

| R | Melting point, °C. |
|---|---|
| Number: | |
| 144 ............... C₆H₅ | 324-325 |
| 145 ............... m-C₆H₄Cl | 311-312 |
| 146 ............... m-C₆H₄OCH₃ | 287-288 |
| 147 ............... p-C₆H₄OCH₃ | 353-354 |
| 148 ............... p-C₆H₄-iPr | 316-317 |
| 149 ............... p-C₆H₄—C₆H₅ | >360 |
| 150 ............... Naphthyl-(1) | 298-299 |
| 151 ............... Naphthyl-(2) | 345-346 |

EXAMPLE 14

4.71 g. of 2 - (naphthyl - 1) - 7 - (p-toylyl)-benzo-[1,2-d:3,4-d']-bis-triazole of the formula (152) 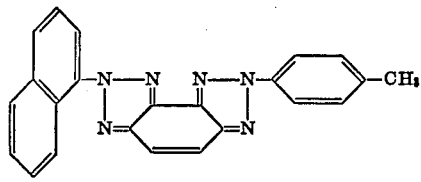

(melting point: 233 to 234° C.), 2.7 g. of the anil from benzaldehyde and p-chloroaniline and 3.1 g. of potassium hydroxide powder containing about 10% of water are reacted in 100 ml. of dimethylformamide in accordance with the instructions of Example 3. 5.6 g., corresponding to 96.6% of theory, of 2 - (naphthyl - 1) - 7 - (stilben-4-yl)-benzo[1,2-d:3,4-d']bis-triazole of the formula (153) 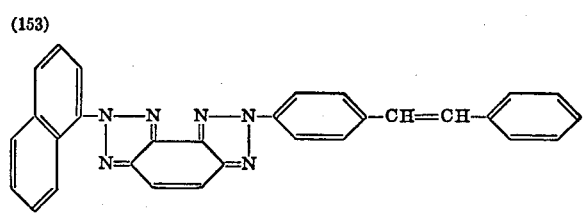

are obtained in the form of a beige powder of melting point 246 to 247° C. On recrystallizing twice from toluene (fuller's earth), 4.6 g. (79.3% of theory) of pale greenish-tinged yellow, felted small needles, melting at 247 to 248° C., are obtained.

Analysis.—For $C_{30}H_{20}N_6$ (464.51): Calculated (percent): C, 77.57; H, 4.34; N, 18.09. Found (percent): C, 77.64; H, 4.37; N, 18.14.

The 2 - (naphthyl - 1) - 7 - (stilben - 4 - yl)-benzo-[1,2-d:3,4-d']bis-triazole derivatives of the formula (154) 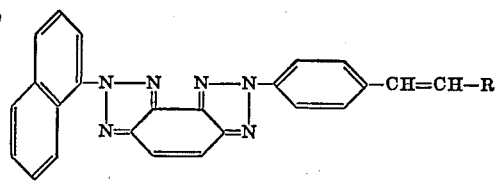

listed in the table which follows can be prepared in a similar manner:

| R | Melting point, °C. |
|---|---|
| Number: | |
| 155 ............... p-C₆H₄Cl | 273-274 |
| 156 ............... m-C₆H₄OCH₃ | 233-234 |
| 157 ............... p-C₆H₄OCH₃ | 254-255 |
| 158 ............... p-C₆H₄—C₆H₅ | 292-293 |
| 159 ............... Naphthyl-(1) | 253-254 |

Starting from 2 - (naphthyl - 2) - 7 - (p-tolyl)-benzo-[1,2-d:3,4-d']bis-triazole of the formula (160)

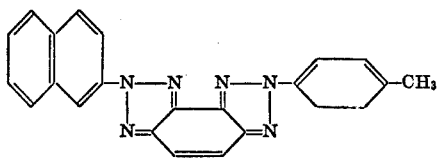

(melting point: 239 to 240° C.) and following the instructions of Example 3, the 2 - (naphthyl - 2) - 7 - (stilben-4-yl) - benzo[1,2-d:3,4-d']bis - triazole derivatives of the formula (161)

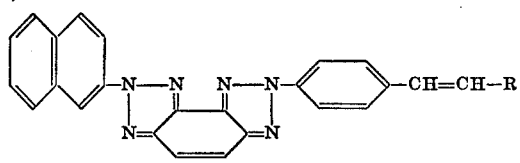

listed in the table which follows can be prepared.

| R | Melting point, °C. |
|---|---|
| Number: | |
| 162 — $C_6H_5$ | 274-275 |
| 163 — $m\text{-}C_6H_5OCH_3$ | 247-248 |
| 164 — $p\text{-}C_6H_4OCH_3$ | 332-333 |
| 165 — $p\text{-}C_6H_4\text{—}C_6H_5$ | 336-337 |
| 166 — Naphthyl-(1) | 248-249 |
| 167 — Naphthyl-(2) | 308-309 |

EXAMPLE 15

100 parts of polyester granules consisting of terephthalic acid ethylene glycol polyester are intimately mixed with 0.05 part of one of the compounds of the Formulae 20, 38, 60, 64, 78, 87, 96, 104, 112, 117, 124, 127, 138, 149, 158 or 165 and fused at 285° C. whilst stirring. After spinning the spinning composition through customary spinnerettes, strongly brightened polyester fibers are obtained.

The above mentioned compounds can also be added to the starting substances before or during the polycondensation to give the polyester.

Example 16

A polyester fabric (for example "Dacron") is padded at room temperature (about 20° C.) with an aqueous dispersion which per liter contains 2 g. of one of the compounds of the Formulae 38, 64, 78, 117, 127 or 138 and 1 g. of an addition product of about 8 mols of ethylene oxide to 1 mol of p-tert. octylphenol, and the fabric is dried at about 100° C. The dry material is subsequently subjected to a heat treatment at 170 to 220° C., lasting from 2 minutes to a few seconds, depending on the temperature. The material treated in this way has a substantially whiter appearance than the untreated material.

What is claimed is:

1. A composition of matter consisting essentially of polyamide or aromatic polyester material and 0.0001 to 2 percent by weight of at least one triazole derivative of the formula

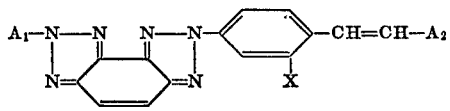

wherein $A_1$ and $A_2$ are identical or different and denote diphenylyl-(4), and naphthyl, or a phenyl radical:

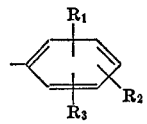

wherein $R_1$, $R_2$ and $R_3$ are identical or different and represent hydrogen, alkyl of at least 2 carbon atoms, alkoxy or chlorine and one of $R_1$, $R_2$ and $R_3$ can also denote phenoxy, phenylmercapto, alkylmercapto or, when two of $R_1$, $R_2$ and $R_3$ are taken together, a methylenedioxy group, and wherein $A_2$ may further be selected from the group consisting of pyridyl-(3), thienyl-(2), and m-tolyl; and wherein X denotes hydrogen, chlorine, nitrile or methoxy.

2. A composition of matter of claim 1 wherein $A_1$ denotes diphenylyl-(4), naphthyl or the phenyl radical, $A_2$ denotes diphenylyl-(4), naphthyl, pyridyl-(3), thienyl-(2), m-tolyl, or the phenyl radical, $R_1$, $R_2$, and $R_3$ are identical or different and represent hydrogen, alkyl with at least 2 carbon atoms, alkoxy or chlorine, and $R_1$ can also denote phenoxy or, when taken together, with $R_2$ a methylene dioxy group, and X denotes hydrogen, chlorine, or methoxy.

3. A composition of matter according to claim 1 wherein $A_1$ represents diphenylyl-(4), naphthyl or the phenyl radical, $A_2$ represents diphenylyl-(4), naphthyl or pyridyl-(3) and, in the case that $A_1$ represents diphenyl-(4), can also represent m-tolyl or the phenyl radical, $R_1$, $R_2$, $R_3$ can be identical or different and denote hydrogen, an alkyl group containing 2 to 4 carbon atoms, an alkoxy group containing 1 to 4 carbon atoms, or chlorine, and furthermore $R_1$ can represent a phenoxy group or an alkylmercapto group containing 1 to 4 carbon atoms and $R_1$ taken together with $R_2$ can be a methylene dioxy group, and X represents hydrogen, chlorine or methoxy.

4. A composition of matter of claim 1 wherein $A_2$ denotes diphenylyl-(4) or the phenyl radical wherein $R_1$ is hydrogen, and $R_2$ and $R_3$ can be identical or different and represent an alkyl group containing 2 to 4 carbon atoms, methoxy, ethoxy, or chlorine, $A_2$ denotes diphenylyl-(4) and, in the case where $A_1$ represents diphenylyl-(4), can also represent the phenyl radical wherein $R_1$, $R_2$, and $R_3$ can be identical or different and denote hydrogen, an alkyl or alkoxy group containing 1 to 4 carbon atoms, with the exception of a methyl group on the o- or p-position, or chlorine, and further $R_1$ can represent a phenoxy group and $R_1$ taken together with $R_2$ can represent a methylenedioxy group, and X denotes hydrogen.

5. A composition of matter of claim 1 wherein $A_1$ denotes diphenylyl-(4), naphthyl, or the phenyl radical wherein $R_1$ denotes hydrogen, an alkyl group containing 2 to 4 carbon atoms, an alkoxy group containing 1 to 4 carbon atoms, phenoxy group, an alkylmercapto group containing 1 to 4 carbon atoms, or chlorine, and $R_2$ and $R_3$ are identical or different and represent hydrogen or methoxy, $A_2$ denotes diphenylyl-(4), naphthyl, pyridyl-(3), thienyl-(2), or the phenyl radical wherein $R_1$ denotes hydrogen, alkyl with 1 to 4 carbon atoms, with the exception of a methyl group in the o- or p-position, alkoxy with 1 to 4 carbon atoms, phenoxy or chlorine, and $R_2$ and $R_3$ are identical or different and denote hydrogen or methoxy or taken together can represent a methylene dioxy group, and X represents hydrogen, chlorine or methoxy.

6. A composition of matter of claim 1 wherein $A_1$ is the phenyl radical wherein $R_1$ is hydrogen and $R_2$ and $R_3$ can be identical or different and represent hydrogen, an alkyl group containing 2 to 4 carbon atoms, methoxy, ethoxy, or chlorine, $A_2$ is diphenylyl-(4), and X is hydrogen.

7. A composition of matter of claim 1 wherein $A_1$ is diphenylyl-(4), $A_2$ is the phenyl radical wherein $R_1$ is hydrogen, and $R_2$ and $R_3$ are identical or different and represent hydrogen, an alkyl group containing 1 to 4 carbon atoms, with the exception of methyl groups in the o- or p-position, methoxy, ethoxy, or chlorine, and X is hydrogen.

8. A composition of matter of claim 1 wherein $A_1$ is the phenyl radical wherein $R_1$, $R_2$, and $R_3$ are hydrogen, $A_2$ is diphenylyl-(4), and X is hydrogen or chlorine.

References Cited

UNITED STATES PATENTS 2,817,665  12/1957  Zweidler et al. ____ 260—240 C
2,972,611  2/1961  Zweidler et al. ____ 260—240 C

OTHER REFERENCES

Chemical Abstracts, vol. 68, pp. 2119–2120 (Abstract No. 21961h of Netherlands published application No. 6615211), 1968.

PATRICK P. GARVIN, Primary Examiner

A. P. DEMERS, Assistant Examiner

U.S. Cl. X.R.

106—148, 176; 117—33.5 T; 252—301.3 W, 543; 260—40 R, 41 C, 41.5 R, 37 P, 39 P, 75, 77.5, 240 C, 240 D, 250 A, 308 B